United States Patent
Omura (10) Patent No.: US 9,917,539 B1
(45) Date of Patent: Mar. 13, 2018

(54) BRUSHLESS DC MOTOR CONTROL DEVICE AND BRUSHLESS DC MOTOR DEVICE

(71) Applicant: KABUSHIKI KAISHA TOSHIBA, Tokyo (JP)

(72) Inventor: Naoki Omura, Fuji Shizuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/444,262

(22) Filed: Feb. 27, 2017

(30) Foreign Application Priority Data

Sep. 13, 2016 (JP) .................................. 2016-178645

(51) Int. Cl.
*H02P 6/16* (2016.01)

(52) U.S. Cl.
CPC ....................................... *H02P 6/16* (2013.01)

(58) Field of Classification Search
CPC ........ H02P 6/16; H02P 2203/05; H02P 6/181; H02P 6/182; H02P 6/188
USPC .................. 318/400.06, 400.21, 400.32, 599
See application file for complete search history.

(56) References Cited

U.S. PATENT DOCUMENTS

| 6,121,736 | A  * | 9/2000  | Narazaki ................ | H02P 6/085 |
| | | | | 318/400.02 |
| 6,400,107 | B1 * | 6/2002  | Nakatani ................ | H02P 6/085 |
| | | | | 318/400.21 |
| 6,670,785 | B1 * | 12/2003 | Liang .................... | H02P 6/34 |
| | | | | 318/490 |
| 7,026,771 | B2 * | 4/2006  | Kushida ................. | H02P 25/14 |
| | | | | 318/798 |
| 7,049,771 | B2 * | 5/2006  | Katanaya ............... | H02M 7/53875 |
| | | | | 318/400.13 |
| 7,102,306 | B2 * | 9/2006  | Hamaoka ............... | F04B 35/04 |
| | | | | 318/400.01 |
| 7,141,943 | B2 * | 11/2006 | Song .................... | H02P 6/28 |
| | | | | 318/400.04 |
| 7,626,350 | B2 * | 12/2009 | Mori .................... | H02P 6/10 |
| | | | | 318/432 |
| 8,106,622 | B2 * | 1/2012  | Aoki .................... | H02M 7/53873 |
| | | | | 318/445 |
| 8,339,077 | B2 * | 12/2012 | Brown .................. | H02P 6/182 |
| | | | | 318/400.1 |

(Continued)

FOREIGN PATENT DOCUMENTS

JP          3663234 B2      6/2005

*Primary Examiner* — Rita Leykin
(74) *Attorney, Agent, or Firm* — Patterson & Sheridan, LLP (57) ABSTRACT

A control device includes: an induced voltage detection circuit that detects induced voltages which is generated in at least one coil of a brushless DC motor; a rotational position that detects the rotational position of a rotor of the brushless DC motor; an error correct circuit that calculates a first difference between a phase of the induced voltage detected by the induced voltage detection circuit and a phase of the rotational position detected by the rotational position detection circuit; a correction circuit that corrects the detected rotational position based on the first difference and outputs a corrected rotational position signal; and a drive signal generation circuit that adjusts a phase of a drive signal which is supplied to the brushless DC motor based on the corrected rotational position signal and generates the drive signal whose phase has been adjusted.

20 Claims, 6 Drawing Sheets

(56) References Cited

U.S. PATENT DOCUMENTS

| | | | | |
|---|---|---|---|---|
| 8,525,491 B2* | 9/2013 | Iwai | ............................ | H02P 9/48 |
| | | | | 322/27 |
| 8,716,964 B2* | 5/2014 | Tanaka | ...................... | H02P 6/18 |
| | | | | 318/400.01 |
| 8,829,829 B2* | 9/2014 | Yoneshima | .............. | H02P 6/185 |
| | | | | 318/400.01 |
| 9,166,517 B2* | 10/2015 | Sato | ...................... | H02P 27/085 |
| 9,225,271 B2 | 12/2015 | Oomura et al. | | |
| 9,436,171 B2* | 9/2016 | Sato | ........................ | H04B 3/50 |
| 2011/0279070 A1* | 11/2011 | Tanaka | ................... | H02P 6/181 |
| | | | | 318/400.1 |

* cited by examiner

FIG. 9

BRUSHLESS DC MOTOR CONTROL DEVICE AND BRUSHLESS DC MOTOR DEVICE

CROSS-REFERENCE TO RELATED APPLICATION

This application is based upon and claims the benefit of priority from Japanese Patent Application No. 2016-178645, filed Sep. 13, 2016, the entire contents of which are incorporated herein by reference.

FIELD

Embodiments described herein relate generally to brushless DC motor control devices and brushless DC motor devices.

BACKGROUND

One method for controlling a brushless DC motor a method which detects the rotational angle of a rotor of the motor based on information of a position sensor such as a Hall element, adjusts the phase of a drive voltage of a drive signal that drives the motor in accordance with the detected rotational angle and outputs the resultant signal to the motor.

The position sensor is attached to the motor in a predetermined position thereof. If an attachment error of the position sensor occurs, even when the phase of the drive voltage of the drive signal is adjusted based on the information of the position sensor, the maximum efficiency cannot be attained.

DETAILED DESCRIPTION

Embodiments provide a brushless DC motor control device and a brushless DC motor device which can generate a motor drive signal from which an attachment error of a position sensor is removed by correction.

In general, according to one embodiment, a brushless DC motor control device includes: an induced voltage detection circuit that detects an induced voltage which is generated in at least one coil of a brushless DC motor; a rotational position detection circuit that detects the rotational position of a rotor of the brushless DC motor; an error calculation circuit that calculates a first difference between the phase of the induced voltage detected by the induced voltage detection circuit and a phase of the rotational position detected by the rotational position detection circuit; a correction circuit that corrects the detected rotational position based on the first difference and outputs a corrected rotational position signal; and a drive signal generation circuit that adjusts the phase of a drive signal which is supplied to the brushless DC motor based on the corrected rotational position signal and generates the drive signal whose phase has been adjusted.

Hereinafter, embodiments will be described with reference to the drawings.

First Embodiment (Configuration)

Figure 1:
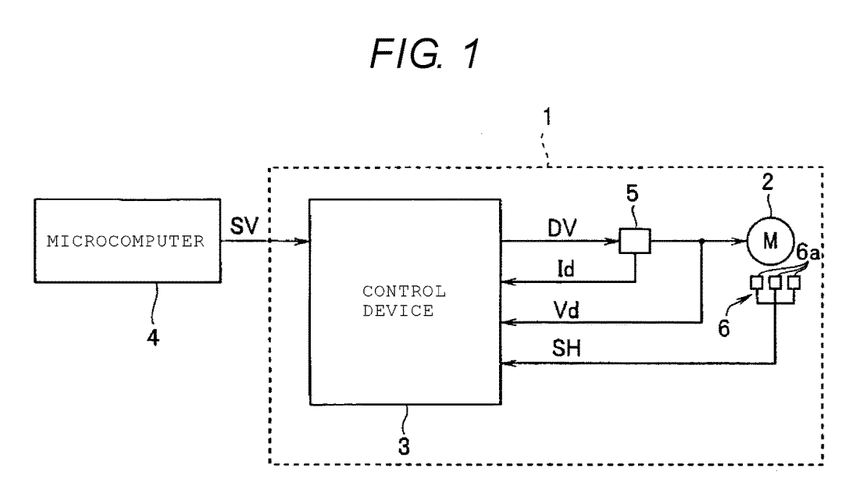
FIG. 1 is a configuration diagram depicting an example of the configuration of a brushless DC motor device according to an embodiment.

FIG. 1 is a configuration diagram depicting an example of the configuration of a brushless DC motor device according to the present embodiment.

As depicted in FIG. 1, a brushless DC motor device 1 includes a brushless DC motor 2 and a control device 3 which is a brushless DC motor control device. A command signal SV from a microcomputer 4, which is an external apparatus, is provided to the brushless DC motor device 1.

Here, the brushless DC motor (hereinafter also referred to simply as the motor) 2 is a three-phase brushless motor. This brushless DC motor 2 has a stator (not depicted in the drawing) in which, for example, a U-phase coil, a V-phase coil, and a W-phase coil are provided and a rotor (not depicted in the drawing) in which a permanent magnet is provided. Alternatively, the brushless DC motor may be an n (n is an integer)-phase brushless motor such as a single-phase brushless motor or a two-phase brushless motor.

The control device 3 is a semiconductor chip that controls the driving of the motor 2 by supplying pseudo-sinusoidal drive signals DV to the coils of the motor 2 from output terminals (not depicted in the drawing).

The three-phase drive signals DV are supplied to the motor 2 via a current detection circuit 5. The current detection circuit 5 is provided on three signal lines by which three three-phase drive signals DV are supplied, detects the current values of three motor currents flowing through the three signal lines, and outputs three motor current value signals Id indicating the three current values. Each motor current value signal Id is a voltage signal in proportion to the current value.

Moreover, the control device 3 supplies the three-phase drive signals DV to the motor 2 from three terminals of the three signal lines, and, as a result of the rotor rotating, three induced voltage value signals Vd indicating induced voltage values which are generated by the three coils are sent to the control device 3 from the motor 2.

A position sensor 6 is attached to an electric substrate, which is incorporated into the motor 2, in a predetermined position thereof. Here, the position sensor 6 is formed of three Hall ICs 6a, each having a Hall element. The position sensor 6 outputs three position detection signals SH, each having an voltage induced by the rotation of the rotor of the motor 2 and a fixed phase difference. Each position detection signal SH is a pulse signal obtained by converting the output of each Hall element into an ON/OFF digital signal by a comparator.

The microcomputer 4 outputs the command signal SV governing the driving of the motor 2 to the control device 3. The command signal SV is an analog signal or a digital signal that designates the output duty ratio or the average duty ratio of the pseudo-sinusoidal drive signals DV which are supplied to the motor 2. The control device 3 controls the driving of the motor 2 by supplying, from the output terminals, the pseudo-sinusoidal drive signals DV to the coils of the motor 2 based on the position detection signals SH and the command signal SV.

Figure 2:
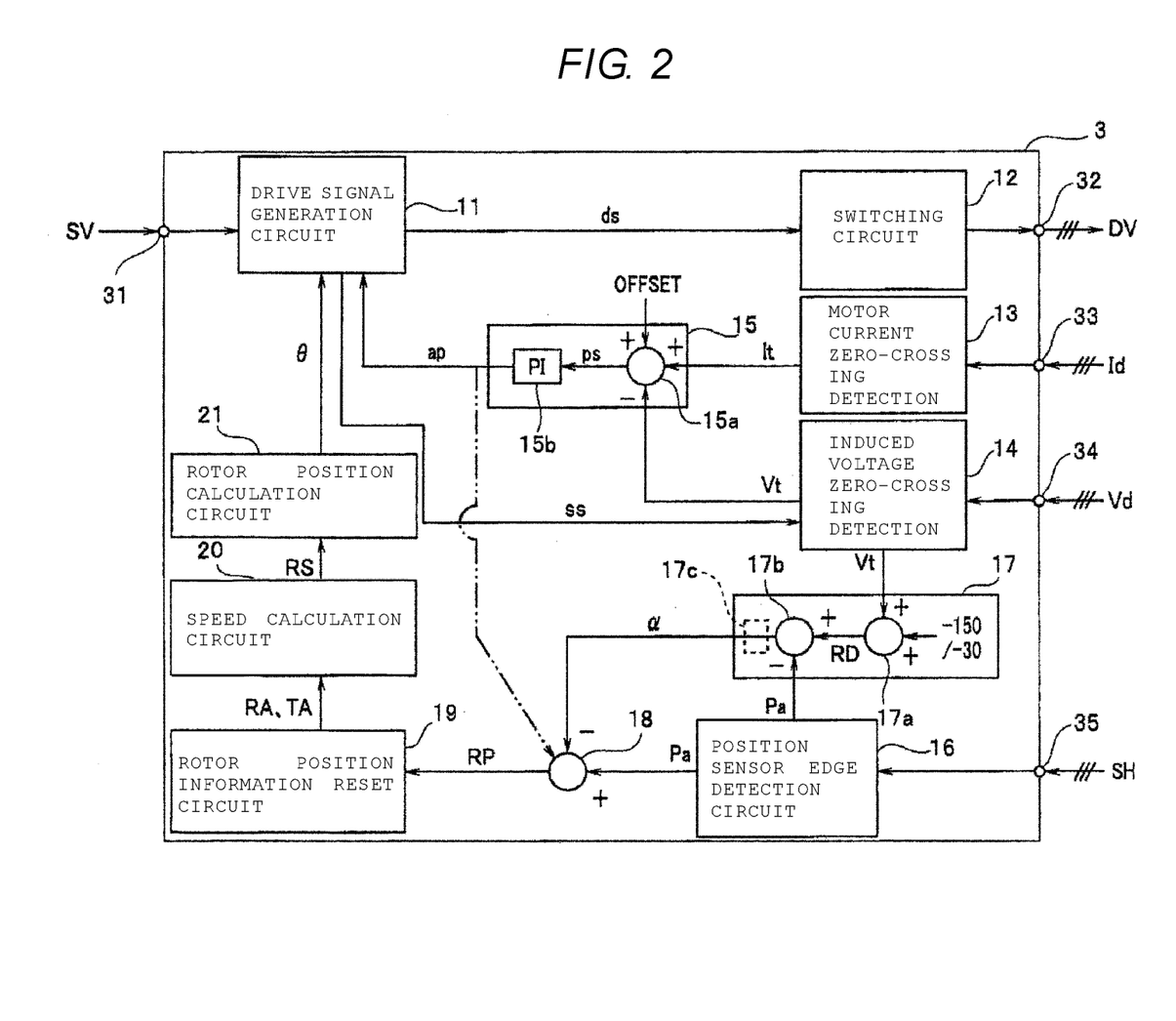
FIG. 2 is a circuit diagram depicting the configuration of a control device according to the embodiment.

FIG. 2 is a circuit diagram depicting the configuration of the control device 3.

The control device 3 is a semiconductor device including a drive signal generation circuit 11, a switching circuit 12, a motor current zero-crossing detection circuit 13, an induced voltage zero-crossing detection circuit 14, a phase correction circuit 15, a position sensor edge detection circuit 16, a position sensor angle error calculation circuit 17, an addition circuit 18, a rotor position information reset circuit 19, a speed calculation circuit 20, and a rotor position calculation circuit 21.

The control device 3 has an input terminal 31 to which the command signal SV is input. Furthermore, the control device 3 has three output terminals 32 from which three pseudo-sinusoidal drive signals are output, three input terminals 33, three input terminals 34, and three input terminals 35.

The drive signal generation circuit 11 generates a sinusoidal signal or a rectangular signal based on the command signal SV from the input terminal 31, generates six drive signals ds from the generated signal and outputs the resultant signals. Here, each drive signal ds is a pulse width modulation (PWM) signal obtained by converting the generated signal into a necessary potential.

The switching circuit 12 generates three pseudo-sinusoidal drive signals DV for driving the motor 2 from a direct-current power supply in accordance with the six drive signals ds and outputs the three pseudo-sinusoidal drive signals DV to the motor 2 from the three output terminals 32. The three drive signals DV cause a current to flow through each of the three coils of the motor 2 and the rotor to rotate.

The switching circuit 12 has, for each phase, a positive-side transistor, a positive-side diode, a negative-side transistor, and a negative-side diode, for example. The switching circuit 12 performs PWM control such that the positive-side transistor and the negative-side transistor are turned on/off in a complementary manner in accordance with the drive signals ds and supplies the pseudo-sinusoidal drive signals DV to the three coils of the motor 2 from the three output terminals 32.

The motor current zero-crossing detection circuit 13 receives the three motor current value signals Id from the current detection circuit 5 via the three input terminals 33 and detects the zero-crossing of each motor current based on, for example, a change in the polarity of each signal. That is, the motor current zero-crossing detection circuit 13 detects timing with which the current value indicated by each motor current value signal Id crosses a zero level. The motor current zero-crossing detection circuit 13 outputs three motor current zero-crossing phase signals It, each indicating timing of a zero-crossing phase. Each motor current zero-crossing phase signal It is a timing signal, for example, a pulse signal, indicating an electrical angle value from a predetermined reference position.

The induced voltage zero-crossing detection circuit 14 receives the three induced voltage value signals Vd of the three signal lines connected to the motor 2 via the three input terminals 34, and compares the three induced voltage value signals Vd with a predetermined threshold voltage, for example, a midpoint potential and thereby detects the zero-crossing of an induced voltage which is generated in each coil of the motor 2. The induced voltage zero-crossing detection circuit 14 outputs induced voltage zero-crossing phase signals Vt, each indicating timing of the zero-crossing phase of each induced voltage. Each induced voltage zero-crossing phase signal Vt is also a timing signal, for example, a pulse signal, indicating an electrical angle value from a predetermined reference position.

In the induced voltage zero-crossing detection circuit 14, timing with which a current is not passed thorough each coil is set in advance, and the induced voltage zero-crossing detection circuit 14 detects the phase of the induced voltage at a zero-crossing point with the set timing. The induced voltage zero-crossing detection circuit 14 outputs three induced voltage zero-crossing phase signals Vt with timing in accordance with the phase at a zero-crossing point.

Since the detection of the zero-crossing of the induced voltage is performed when the pseudo-sinusoidal drive voltage signal DV is not supplied to each coil, the drive signal generation circuit 11 turns off the output of each drive signal ds during a period in which the zero-crossing of the induced voltage is detected. Therefore, to the induced voltage zero-crossing detection circuit 14, a sampling signal ss indicating zero-crossing detection timing in a state in which the output of each drive signal ds from the drive signal generation circuit 11 is off is input.

Even though, here, the induced voltage zero-crossing detection circuit 14 detects the zero-crossing of the three induced voltage value signals Vd of the three signal lines connected to the motor 2, the induced voltage zero-crossing detection circuit 14 may detect the zero-crossing of the induced voltage value signal Vd of only one of the three signal lines.

Accordingly, the motor current zero-crossing detection circuit 13 detects a motor current which is supplied to at least one coil of the brushless DC motor 2. The induced voltage zero-crossing detection circuit 14 forms an induced voltage detection circuit that detects an induced voltage which is generated in at least one coil of the brushless DC motor 2.

The phase correction circuit 15 includes an addition circuit 15a and a proportional integration circuit (PI) 15b.

The addition circuit 15a detects the three motor current zero-crossing phase signals It from the motor current zero-crossing detection circuit 13 and the three induced voltage zero-crossing phase signals Vt from the induced voltage zero-crossing detection circuit 14 and calculates three differences. That is, the addition circuit 15a calculates three differences between the three motor current zero-crossing phase signals It and the three induced voltage zero-crossing phase signals Vt, and outputs a phase difference signal ps indicating the average value of the three phase differences to the proportional integration circuit 15b. Alternatively, the phase difference signal ps may be a signal indicating the value of one phase difference selected from the three phase differences.

In some embodiments, an offset value (OFFSET) which is used when the motor 2 is a motor having salient polarity, such as an interior permanent magnet (IPM) motor, can be input to the addition circuit 15a.

In the proportional integration circuit 15b, a proportional component and an integral component are calculated based on the input phase difference signal ps, and the proportional integration circuit 15b outputs the proportional component and the integral component to the drive signal generation circuit 11 as phase correction command information ap. The proportional integration circuit 15b generates the phase correction command information ap with which the input phase difference signal ps becomes zero, and holds that value.

Based on the phase correction command information ap, the drive signal generation circuit 11 generates six drive signals ds obtained by adjusting the voltage phases of the U-phase, V-phase, and W-phase drive signals DV such that the phases of the motor current signals of the U-phase, V-phase, and W-phase drive signals DV and the phases of the induced voltages coincide with each other.

That is, the drive signal generation circuit 11 also adjusts the phases of the drive signals DV such that, based on the phase correction command information ap indicating the differences between the phases of the motor currents detected by the motor current zero-crossing detection circuit 13 and the phases of the induced voltages detected by the induced voltage zero-crossing detection circuit 14, the phases of the motor currents and the phases of the induced voltages coincide with each other.

The position sensor edge detection circuit 16 receives the three position detection signals SH via the three input terminals 35, detects the edge of each position detection signal SH based on the rising edge of the pulse signal, and outputs three position sensor edge angle signals Pa indicating electrical angle values from a predetermined reference position to the position sensor angle error calculation circuit 17 and the addition circuit 18.

That is, the position sensor edge detection circuit 16 forms a rotational position detection circuit that receives the position detection signals SH from the position sensor 6 attached to the stator of the motor 2 and detects the rotational position of the rotor of the motor 2.

The position sensor angle error calculation circuit 17 includes two addition circuits 17a and 17b.

The addition circuit 17a adds the three induced voltage zero-crossing phase signals Vt from the induced voltage zero-crossing detection circuit 14 and a predetermined offset value and outputs the values obtained by the addition to the addition circuit 17b as output signals. The predetermined offset value is a value for correcting the phase differences between the three induced voltage zero-crossing phase signals Vt and the three position sensor edge angle signals Pa from the position sensor edge detection circuit 16. Here, as the offset value, there are two offset values: an offset value (−150°) at the time of clockwise rotation and an offset value (−30°) at the time of counterclockwise rotation. The output signals of the addition circuit 17a are angular signals RD.

Here, these offset values will be described.

Figure 3:
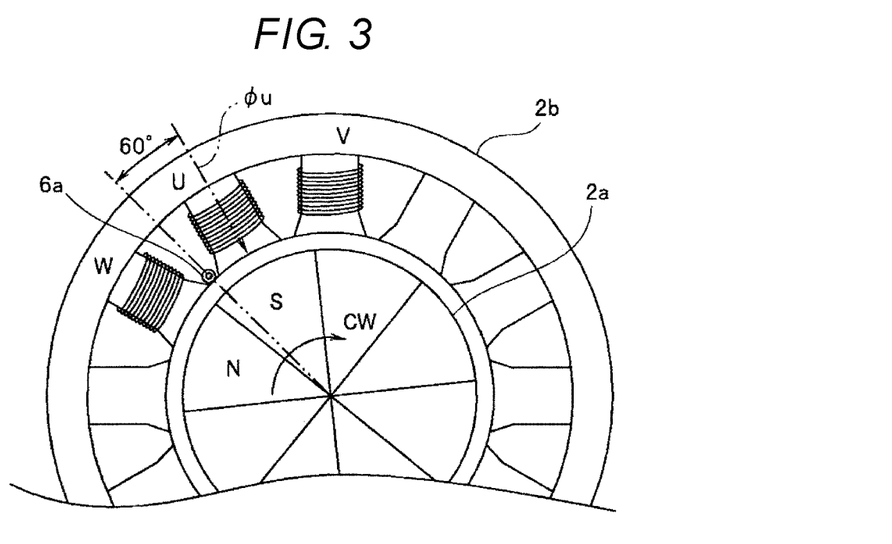
FIG. 3 is a diagram depicting the structure of a motor for explaining the relationship between the phases of induced voltage zero-crossing phase signals and position sensor edge angle signals in a clockwise direction of a rotor of the motor according to the embodiment.
Figure 4:
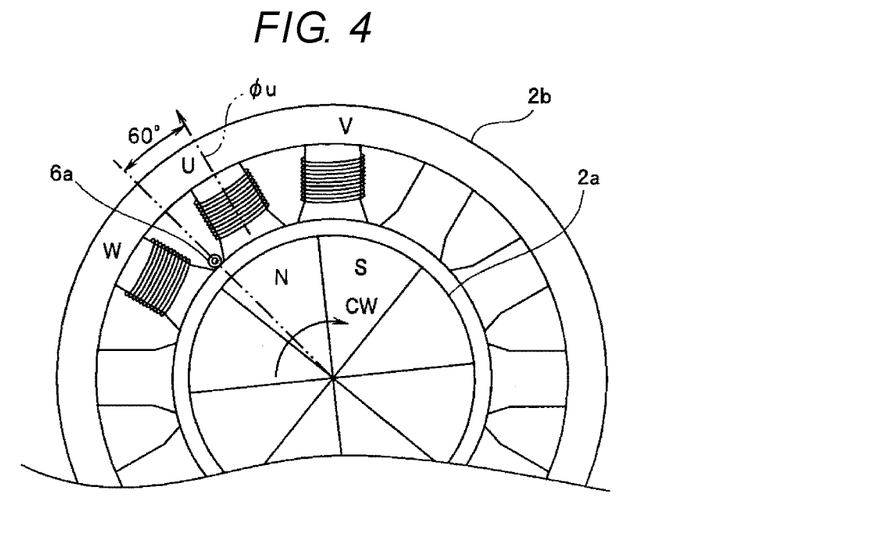
FIG. 4 is a diagram depicting the structure of the motor for explaining the relationship between the phases of the induced voltage zero-crossing phase signals and the position sensor edge angle signals in the clockwise direction of the rotor of the motor according to the embodiment.

FIGS. 3 and 4 are diagrams, each depicting the structure of the motor for explaining the relationship between the phases of the induced voltage zero-crossing phase signals Vt and the position sensor edge angle signals Pa in a clockwise direction of the rotor of the motor 2. When a rotor 2a rotates in a clockwise direction CW, the positional relationship between the magnets of the rotor 2a and the coils of a stator 2b changes from the positional relationship depicted in FIG. 3 to the positional relationship depicted in FIG. 4.

Figure 5:
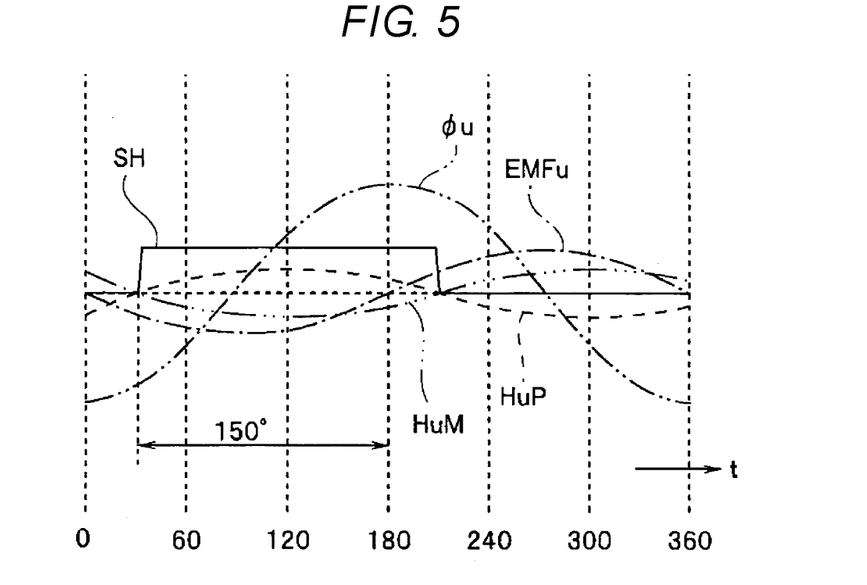
FIG. 5 is a waveform diagram of a flux linkage, an induced voltage, a Hall element output, a Hall element inverted output, and a position detection signal in the U-phase at the time of clockwise rotation of the rotor of the motor according to the embodiment.

FIG. 5 is a waveform diagram of a flux linkage φu, an induced voltage EMFu, a Hall element output Hup, a Hall element inverted output HuM, and the position detection signal SH in the U-phase at the time of clockwise rotation of the rotor of the motor 2.

An N-pole magnet and an S-pole magnet are affixed to the rotor 2a, and the U-phase, V-phase, and W-phase coils are wound around iron cores on the stator 2b. FIG. 3 depicts a state in which the U-phase coil and the S-pole magnet are facing each other, and FIG. 4 depicts a state in which the U-phase coil and the N-pole magnet are facing each other.

As depicted in FIG. 3, the Hall IC 6a is disposed between the adjacent coils of the stator 2b. When the drive signal DV is supplied to each coil of the motor 2, the flux linkage φu is generated in the U-phase. The phase of the Hall element output Hup of the Hall element of the Hall IC 6a leads the phase of the flux linkage φu by 60 (deg) in terms of an electrical angle.

Since the induced voltage EMFu lags the flux linkage φu by π/2, the phase of the induced voltage EMFu lags the position detection signal SH by 150 (deg) in terms of an electrical angle.

Figure 6:
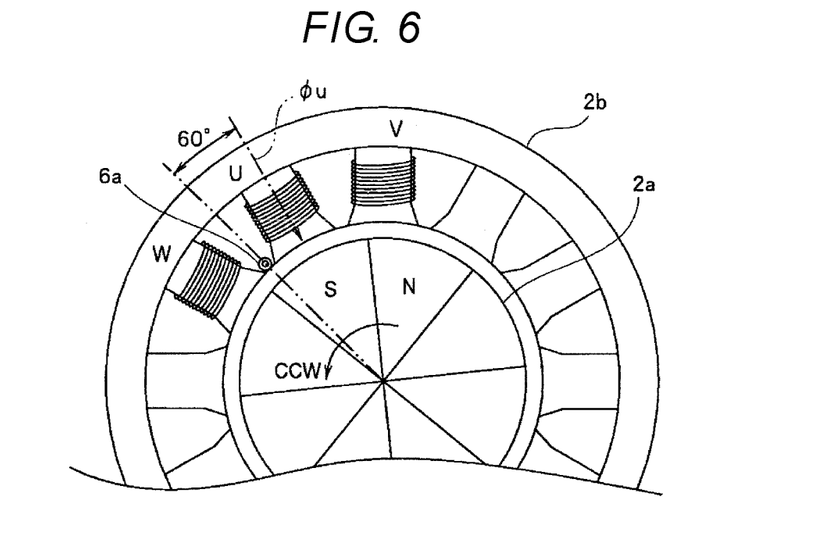
FIG. 6 is a diagram depicting the structure of the motor for explaining the relationship between the phases of the induced voltage zero-crossing phase signals and the position sensor edge angle signals in a counterclockwise direction of the rotor of the motor according to the embodiment.
Figure 7:
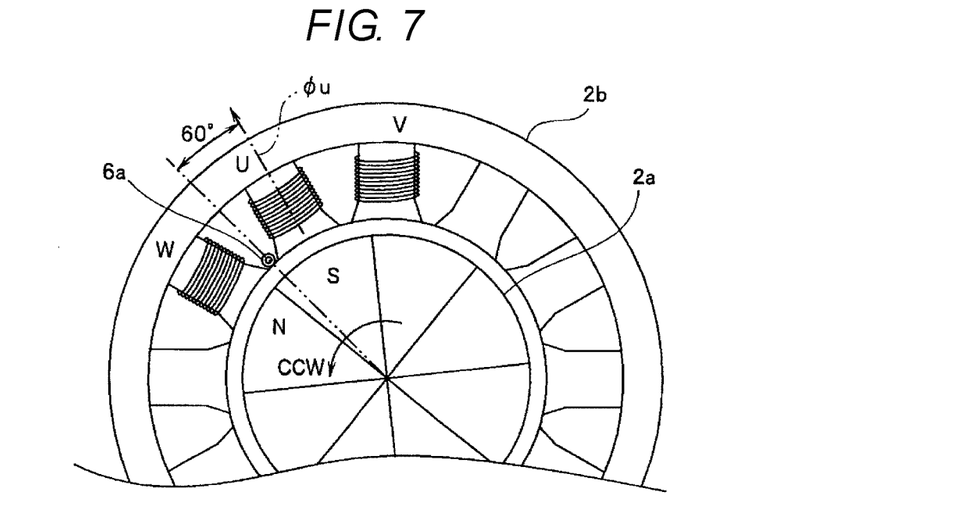
FIG. 7 is a diagram depicting the structure of the motor for explaining the relationship between the phases of the induced voltage zero-crossing phase signals and the position sensor edge angle signals in the counterclockwise direction of the rotor of the motor according to the embodiment.

FIGS. 6 and 7 are diagrams, each depicting the structure of the motor for explaining the relationship between the phases of the induced voltage zero-crossing phase signals Vt and the position sensor edge angle signals Pa in a counter-clockwise direction of the rotor of the motor 2. When the rotor 2a rotates in a counterclockwise direction CCW, the positional relationship between the magnets of the rotor 2a and the coils of the stator 2b changes from the positional relationship depicted in FIG. 6 to the positional relationship depicted in FIG. 7.

Figure 8:
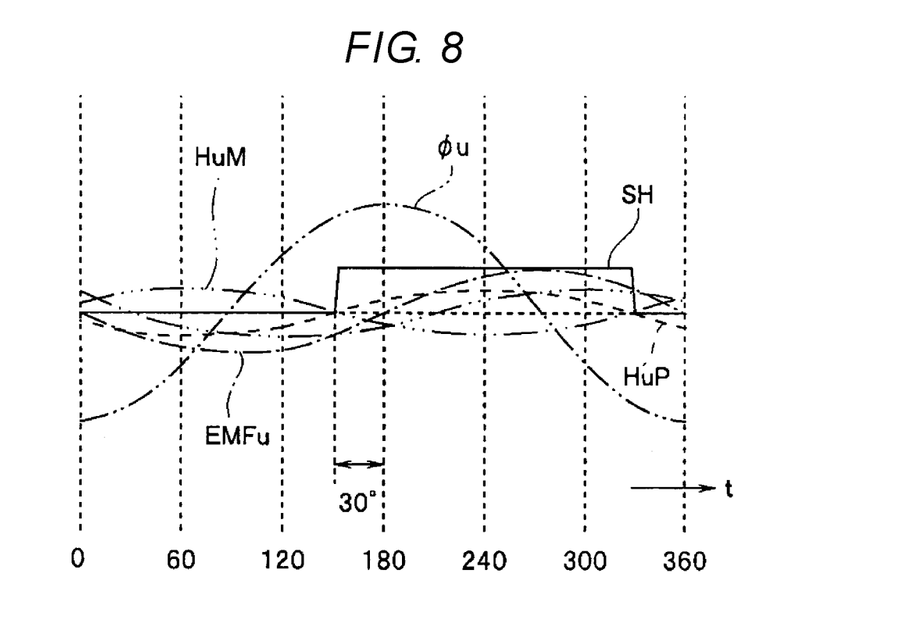
FIG. 8 is a waveform diagram of the flux linkage, the induced voltage, the Hall element output, the Hall element inverted output, and the position detection signal in the U-phase at the time of counterclockwise rotation of the rotor of the motor according to the embodiment.

FIG. 8 is a waveform diagram of the flux linkage φu, the induced voltage EMFu, the Hall element output Hup, the Hall element inverted output HuM, and the position detection signal SH in the U-phase at the time of counterclockwise rotation of the rotor of the motor 2. FIG. 6 depicts a state in which the U-phase coil and the S-pole magnet are facing each other, and FIG. 7 depicts a state in which the U-phase coil and the N-pole magnet are facing each other.

As depicted in FIG. 6, the Hall IC 6a is disposed between the adjacent coils of the stator 2b. When the drive signal DV is supplied to each coil of the motor 2, the flux linkage φu is generated in the U-phase. The phase of the Hall element output Hup of the Hall element of the Hall IC 6a lags the phase of the flux linkage φu by 60 (deg) in terms of an electrical angle.

Since the induced voltage EMFu lags the flux linkage φu by π/2, the phase of the induced voltage EMFu lags the position detection signal SH by 30 (deg) in terms of an electrical angle.

Referring back to FIG. 2, as described earlier, the angular signals RD indicate the positions of the phases of the three position sensor edge angle signals which are originally detected based on the zero-crossing phase signals Vt signals and offset values.

The addition circuit 17b calculates differences between the angular signals RD which are output from the addition circuit 17a and the position sensor edge angle signals Pa from the position sensor edge detection circuit 16 and holds the differences, and outputs three position sensor error signals α indicating an error in the position sensor 6.

Thus, the addition circuit 17b in effect forms an error calculation circuit that calculates differences between the phases of the induced voltages detected by the induced voltage zero-crossing detection circuit 14 and the phase of the rotational position of the rotor of the motor 2 detected by the position sensor edge detection circuit 16.

In one embodiment, as indicated by a dotted line in FIG. 2, a nonvolatile memory 17c may be provided in the position sensor angle error calculation circuit 17 such that the three position sensor error signals α are stored in the nonvolatile memory 17c.

The addition circuit 18 adds the position sensor error signals α to the position sensor edge angle signals Pa or subtracts the position sensor error signals α from the position sensor edge angle signals Pa and outputs to the rotor position information reset circuit 19 corrected position sensor edge angle signals RP obtained by correcting errors in the position sensor edge angle signals Pa, that is, electrical angle errors caused by an attachment error at the time of attachment of the position sensor 6 to the motor 2.

Thus, the addition circuit 18 forms a correction circuit that corrects the detected rotational position of the rotor of the motor 2 based on the position sensor error signals α and outputs the corrected position sensor edge angle signals RP which are corrected rotational position signals.

The rotor position information reset circuit 19 calculates a changed angle of the rotor by resetting the phase at each 60° and outputs a rotor changed-angle signal RA and a reset time interval signal TA to the speed calculation circuit 20. The rotor changed-angle signal RA indicates the changed-angle value of the rotor, and the reset time interval signal TA indicates a reset time interval.

The speed calculation circuit 20 receives the rotor changed-angle signal RA and the reset time interval signal TA from the rotor position information reset circuit 19, calculates a rotor rotational-speed information signal RS by dividing the rotor changed-angle value by the reset time interval, and outputs the rotor rotational-speed information signal RS to the rotor position calculation circuit 21.

The rotor position calculation circuit 21 has an integrator, and integrates the rotational speed of the rotor of the rotor rotational-speed information signal RS and outputs a rotor position information signal θ to the drive signal generation circuit 11. The rotor position information signal θ indicates an electrical angle in the range of 0° to 360°.

Based on the command signal SV, the rotor position information signal θ, and the phase correction command information ap, the drive signal generation circuit 11 generates drive signals ds for outputting three-phase drive voltage signals DV to the motor 2.

As described above, the control device 3 controls the driving of the motor 2 by supplying, from the output terminals, pseudo-sinusoidal drive signals DV to the coils of the motor 2 based on the position detection signals SH and the command signal SV from the outside.

Even when an attachment error at the time of attachment of the position sensor 6, such as the Hall IC 6a or the like, to the motor 2 occurs, differences between the phase of the rotational position detected by the position sensor 6 and the phases of the induced voltages of the motor 2 are calculated, and the rotational position information of the position sensor 6 is corrected based on the differences. As a result, even when an attachment error of the position sensor 6 occurs, the phase of a drive voltage of a motor drive signal is adjusted based on the corrected rotational position information, whereby the motor 2 can be driven at the maximum efficiency.

That is, the drive signal generation circuit 11 adjusts the phases of the drive signals DV which are supplied to the motor 2 based on the corrected position sensor edge angle signals RP and generates the drive signals DV whose phases have been adjusted.

Furthermore, since the phases of the drive signals DV are adjusted based on the differences between the phases of the motor currents and the phases of the induced voltages such that the phases of the motor currents and the phases of the induced voltages coincide with each other, the motor 2 can be driven more efficiently.

Next, modified examples will be described.

As a first modified example, while, in the above-described embodiment, the phase correction command information ap which is a signal about the differences between the phases of the motor currents and the phases of the induced voltages is supplied to the drive signal generation circuit 11, the phase correction command information ap may be supplied to the addition circuit 18 as indicated by a chain double-dashed line in FIG. 2 and the three position sensor edge angle signals Pa may be corrected in the addition circuit 18 such that the phases of the motor currents and the phases of the induced voltages coincide with each other.

Furthermore, as a second modified example, the motor current zero-crossing detection circuit 13 and the induced voltage zero-crossing detection circuit 14 may be formed as one circuit.

Figure 9:
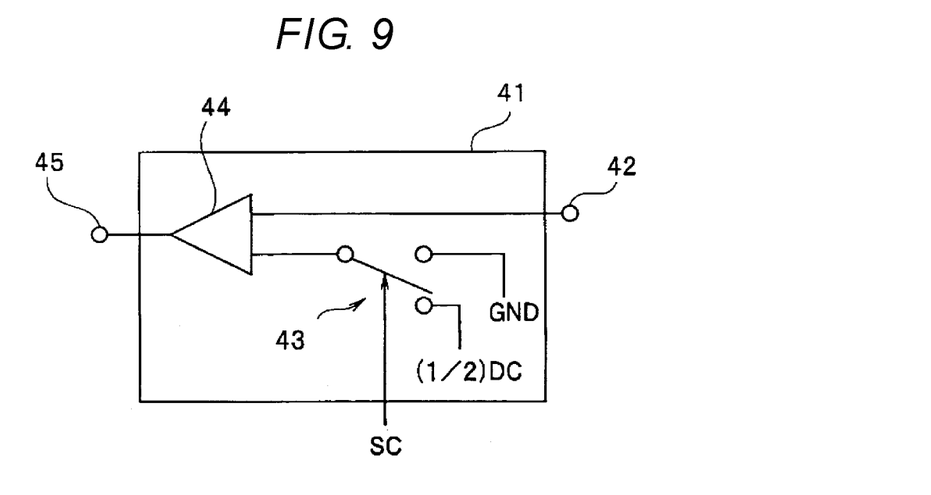
FIG. 9 is a diagram depicting the configuration of a comparison circuit according to a second modified example of the embodiment.

FIG. 9 is a diagram depicting the configuration of a comparison circuit according to the second modified example of the present embodiment. A comparison circuit 41 includes an input terminal 42 that is connected to a current-carrying terminal of the motor 2, a selection circuit 43 that selects any one of two inputs, a comparator 44, and an output terminal 45 that outputs the comparison result of the comparator 44. The comparator 44 has a first input connected to the input terminal 42 and a second input connected to an output terminal of the selection circuit 43, and compares the first input and the second input and outputs the comparison result.

The selection circuit 43 selects any one of GND and a predetermined voltage, here, (½)DC, in accordance with a selection control signal SC, and the selected one is connected to the second input of the comparator 44. Here, DC is a terminal voltage of the motor 2 which is generated when the drive signals DV are provided thereto. The selection control signal SC is supplied from the drive signal generation circuit 11.

As described earlier, timing with which the zero-crossing of the motor current is detected and timing with which the zero-crossing of the induced voltage is detected are different from each other. Thus, with the timing with which the zero-crossing of the motor current is detected, the selection control signal SC operates the selection circuit 43 such that the potential of GND is provided to the second input of the comparator 44. With the timing with which the zero-crossing of the induced voltage is detected, the selection control signal SC operates the selection circuit 43 such that the potential of (½)DC is provided to the second input of the comparator 44.

That is, the induced voltage zero-crossing detection circuit 14 detects the zero-crossing of the induced voltage by comparing the induced voltage and a first threshold voltage with the comparator 44, and the motor current zero-crossing detection circuit 13 detects the zero-crossing of the motor current by comparing a voltage indicating the motor current value with a second threshold voltage, in place of the first threshold voltage, with the comparator 44.

By doing so, the circuit size of the control device 3 can be reduced and the cost can also be reduced accordingly.

As described above, according to the above-described embodiment and modified examples, a brushless DC motor control device and a motor device which can output a motor drive signal from which an attachment error of a position sensor is removed by correction can be provided.

In particular, in the above-described embodiment and modified examples, since an attachment error of the position sensor 6 attached to the motor 2 is detected by using a timing signal of the zero-crossing of the induced voltage detected by the induced voltage zero-crossing detection circuit 14, even when an attachment error occurs in the position sensor 6, in other words, even when the position sensor 6 is not attached to the motor 2 accurately, the brushless DC motor control device and the motor device can output a motor drive signal from which the attachment error of the position sensor 6 is removed by correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A brushless DC motor control device comprising:
   an induced voltage detection circuit that detects an induced voltage which is generated in at least one coil of a brushless DC motor;
   a rotational position detection circuit that detects a rotational position of a rotor of the brushless DC motor;
   an error calculation circuit that calculates a first difference between a phase of the induced voltage detected by the induced voltage detection circuit and a phase of the rotational position detected by the rotational position detection circuit;
   a correction circuit that corrects the detected rotational position based on the first difference and outputs a corrected rotational position signal; and
   a drive signal generation circuit that adjusts a phase of a drive signal which is supplied to the brushless DC motor based on the corrected rotational position signal and generates the drive signal whose phase has been adjusted.

2. The brushless DC motor control device according to claim 1, further comprising:
   a motor current detection circuit that detects a motor current which is supplied to the at least one coil of the brushless DC motor,
   wherein based on a second difference between a phase of the motor current detected by the motor current detection circuit and the phase of the induced voltage detected by the induced voltage detection circuit, the drive signal generation circuit adjusts the phase of the drive signal such that the phase of the motor current and the phase of the induced voltage coincide with each other.

3. The brushless DC motor control device according to claim 2, wherein
   the induced voltage detection circuit detects a zero-crossing of the induced voltage and the motor current detection circuit detects a zero-crossing of the motor current.

4. The brushless DC motor control device according to claim 3, wherein
   the induced voltage detection circuit detects the zero-crossing of the induced voltage by comparing the induced voltage and a first threshold voltage with a comparator, and
   the motor current detection circuit detects the zero-crossing of the motor current by comparing a voltage indicating the motor current value and a second threshold voltage, in place of the first threshold voltage, with the comparator.

5. The brushless DC motor control device according to claim 1, wherein
   the rotational position detection circuit receives a position detection signal from a position sensor attached to a stator of the motor and detects the rotational position of the rotor.

6. The brushless DC motor control device according to claim 5, wherein
   the position sensor includes a Hall element.

7. A brushless DC motor device comprising:
   a brushless DC motor; and
   a control device,
   wherein the control device includes
      an induced voltage detection circuit that detects an induced voltage which is generated in at least one coil of a brushless DC motor,
      a rotational position detection circuit that detects a rotational position of a rotor of the brushless DC motor,
      an error calculation circuit that calculates a first difference between a phase of the induced voltage detected by the induced voltage detection circuit and a phase of the rotational position detected by the rotational position detection circuit,
      a correction circuit that corrects the detected rotational position based on the first difference and outputs a corrected rotational position signal, and
      a drive signal generation circuit that adjusts a phase of a drive signal which is supplied to the brushless DC motor based on the corrected rotational position signal and generates the drive signal whose phase has been adjusted.

8. The brushless DC motor device according to claim 7, further comprising:
   a motor current detection circuit that detects a motor current which is supplied to the at least one coil of the brushless DC motor,
   wherein based on a second difference between a phase of the motor current detected by the motor current detection circuit and the phase of the induced voltage detected by the induced voltage detection circuit, the drive signal generation circuit adjusts the phase of the drive signal such that the phase of the motor current and the phase of the induced voltage coincide with each other.

9. The brushless DC motor device according to claim 8, wherein the induced voltage detection circuit detects a zero-crossing of the induced voltage and the motor current detection circuit detects a zero-crossing of the motor current.

10. The brushless DC motor device according to claim 9, wherein the induced voltage detection circuit detects the zero-crossing of the induced voltage by comparing the induced voltage and a first threshold voltage with a comparator, and the motor current detection circuit detects the zero-crossing of the motor current by comparing a voltage indicating the motor current value and a second threshold voltage, in place of the first threshold voltage, with the comparator.

11. The brushless DC motor device according to claim 7, wherein the rotational position detection circuit receives a position detection signal from a position sensor attached to a stator of the motor and detects the rotational position of the rotor.

12. The brushless DC motor device according to claim 11, wherein the position sensor includes a Hall element.

13. A brushless DC motor control device comprising:
   an induced voltage detection circuit that detects a zero-crossing of an induced voltage that is generated in at least one coil of a brushless DC motor having a rotor and a stator with at least one coil and a position sensor attached near the coil;
   a motor current detection circuit that detects a zero-crossing of motor current to the at least one coil of the brushless DC motor;
   a phase correction circuit that receives the detected zero-crossing of the induced voltage and the detected zero-crossing of the current in the at least one coil of the brushless DC motor and generates phase correction command information;
   a rotational position sensor edge detection circuit that detects a zero-crossing of a position sensor attached to the rotor and generates a position sensor edge angle signal;
   a position sensor angle calculation circuit that receives the detected zero-cross of the induced voltage and the position sensor edge angle signal and generates a position sensor error signal; and
   a drive signal generation circuit that generates a drive signal that is adjusted based on the phase correction command information, the position sensor error signal and the position sensor edge angle signal and supplies the adjusted drive signal to the brushless DC motor.

14. The brushless DC motor control device of claim 13, wherein the phase correction circuit includes:
   an addition circuit that generates a phase difference signal that reflects a difference between the detected zero-crossing of the motor current and the detected zero-crossing of the induced voltage; and
   a proportional integration circuit that converts the phase difference signal to the phase correction command information.

15. The brushless DC motor control device of claim 14, wherein the phase correction command information specifies an amount of correction that causes the phase difference signal to become zero.

16. The brushless DC motor control device of claim 13, wherein the position sensor angle calculation circuit includes:

a first addition circuit that generates an angular signal that reflects a difference between the detected zero-crossing of the induced voltage and a predetermined offset value;
a second addition circuit that generates the position sensor error signal indicating error in the position sensor based on the angular signal and the position sensor edge angle signal.

17. The brushless DC motor control device of claim 13, further comprising:
   an addition circuit that generates a corrected position sensor edge angle signal based on the position sensor edge angle signal and the position sensor error signal;
   a rotor position information reset circuit that generates a rotor changed-angle signal and a reset time interval signal based on the corrected position sensor edge signal;
   a speed calculation circuit that generates a rotational-speed information signal based on the rotor changed-angle signal and the reset time interval signal; and
   a rotor position calculation circuit that generates a rotor position information signal based on the rotational-speed information signal and provides the rotor position information signal to the drive signal generation circuit.

18. The brushless DC motor control device of claim 13, further comprising:
   an addition circuit that generates a corrected position sensor edge angle signal based on the position sensor edge angle signal, the position sensor error signal and the phase correction command information;
   a rotor position information reset circuit that generates a rotor changed-angle signal and a reset time interval signal based on the corrected position sensor edge signal;
   a speed calculation circuit that generates a rotational-speed information signal based on the rotor changed-angle signal and the reset time interval signal; and
   a rotor position calculation circuit that generates a rotor position information signal based on the rotational-speed information signal and provides the rotor position information signal to the drive signal generation circuit.

19. The brushless DC motor control device of claim 13, wherein the induced voltage detection circuit detects the zero-crossing of the induced voltage by comparing the induced voltage and a first threshold voltage with a comparator.

20. The brushless DC motor control device of claim 13, wherein the induced voltage detection circuit detects the zero-crossing of the motor current by comparing the motor current and a second threshold voltage with a comparator.

* * * * *